United States Patent [19]

Stone

[11] 4,080,840

[45] Mar. 28, 1978

[54] VIBRATOR DEVICE

[75] Inventor: Spencer A. Stone, Fort Wayne, Ind.

[73] Assignee: The Deister Concentrator Co., Inc., Fort Wayne, Ind.

[21] Appl. No.: 741,739

[22] Filed: Nov. 15, 1976

[51] Int. Cl.[2] .......... F16H 33/00
[52] U.S. Cl. .......... 74/61
[58] Field of Search .......... 74/61

[56] References Cited

U.S. PATENT DOCUMENTS

| | | | |
|---|---|---|---|
| 3,119,275 | 1/1964 | Ambrose | 74/61 |
| 3,703,236 | 11/1972 | Spurlin et al. | 74/61 |

FOREIGN PATENT DOCUMENTS

| | | | |
|---|---|---|---|
| 781,514 | 8/1957 | United Kingdom | 74/61 |

*Primary Examiner*—Benjamin W. Wyche
*Assistant Examiner*—Wesley S. Ratliff, Jr.
*Attorney, Agent, or Firm*—Gust, Irish, Jeffers & Rickert

[57] ABSTRACT

A vibrator device, especially for connecting to a screen element for agitating the screen element, and including rotary shafts with off-center weights so oriented relatively that the agitation of the screen takes the form of vibratory movement thereof in one direction with a stronger impulse being imparted to the screen in one direction than in the other.

14 Claims, 2 Drawing Figures

VIBRATOR DEVICE

BACKGROUND OF THE INVENTION

1. Field of the Invention

The present invention relates to a vibrator device for imparting vibratory motion, especially to a screen or the like.

2. Description of the Prior Art

Vibrator devices for vibrating screens or other shifting or separating devices are know as, for example, the vibrator device illustrated in U.S. Pat. No. 3,879,284. In the patent referred to, parallel shafts are provided having off-center weights thereon geared together to run in a 2 to 1 ratio with the weights so oriented that the vibratory forces exerted by the shafts during rotation thereof are substantially in a straight line with a stronger impulse in one direction than in the other.

The weights in the patent referred to above are connected to arms and are spaced outwardly from the axes of rotation of the shafts which carry the arms. This leaves a rather bulky configuration of the device and considerable expense is encountered in fabricating the device.

SUMMARY OF THE INVENTION

According to the present invention, the off-center weights carried by the shafts are mounted directly thereon and are, furthermore, formed of a stack of plates so that the amount of weight carried by any one shaft can readily be adjusted whenever desired.

According to the present invention, a housing is formed which is open on one side, as by welding a plurality of plates together and providing a further plate for bolting to the welded together plates to close the housing. The housing has mounted therein two pairs of shafts with the shafts of each pair rotating in respectively opposite directions.

The shafts have off-center weights thereon and thus develop forces on the housing as the shafts rotate. With the shafts of each pair rotating at the same speed and in respectively opposite direction, the weights thereon can be so oriented that each pair of shafts imparts a resultant force to the housing in one plane only.

The shaft of each pair is aligned with the shaft of the other pair in the direction of the aforementioned plane and rotate at a speed ratio of 2 to 1 and the weights thereon are so oriented as to be on the same side of the respective shafts in a direction parallel to the plane in one rotated position of the shafts while being on opposite sides of the respective shafts in a direction parallel to the aforementioned plane in another rotated position of the shafts. The several shafts and the weights thereon thus impart a strong impulse to the housing in one direction parallel to the aforementioned plane in one rotated position of the shafts and impart weaker force to the housing in the other rotated position of the shafts. In intermediate positions of the shafts, substantially no resultant force is imparted to the housing.

An object of the present invention is the provision of a vibrator device for connection to a screen or the like which is compact and in which the weights on each shaft of the vibrator device can readily be adjusted.

Another object of the present invention is the provision of a vibrator device which can be manufactured to small dimensions and thus presents a compact package that can readily be incorporated in machines without requiring a great deal of space.

The above-mentioned and other features and objects of this invention and the manner of attaining them will become more apparent and the invention itself will be best understood by reference to the following description of an embodiment of the invention taken in conjunction with the accompanying drawings.

DESCRIPTION OF THE PREFERRED EMBODIMENT

Figure 1:
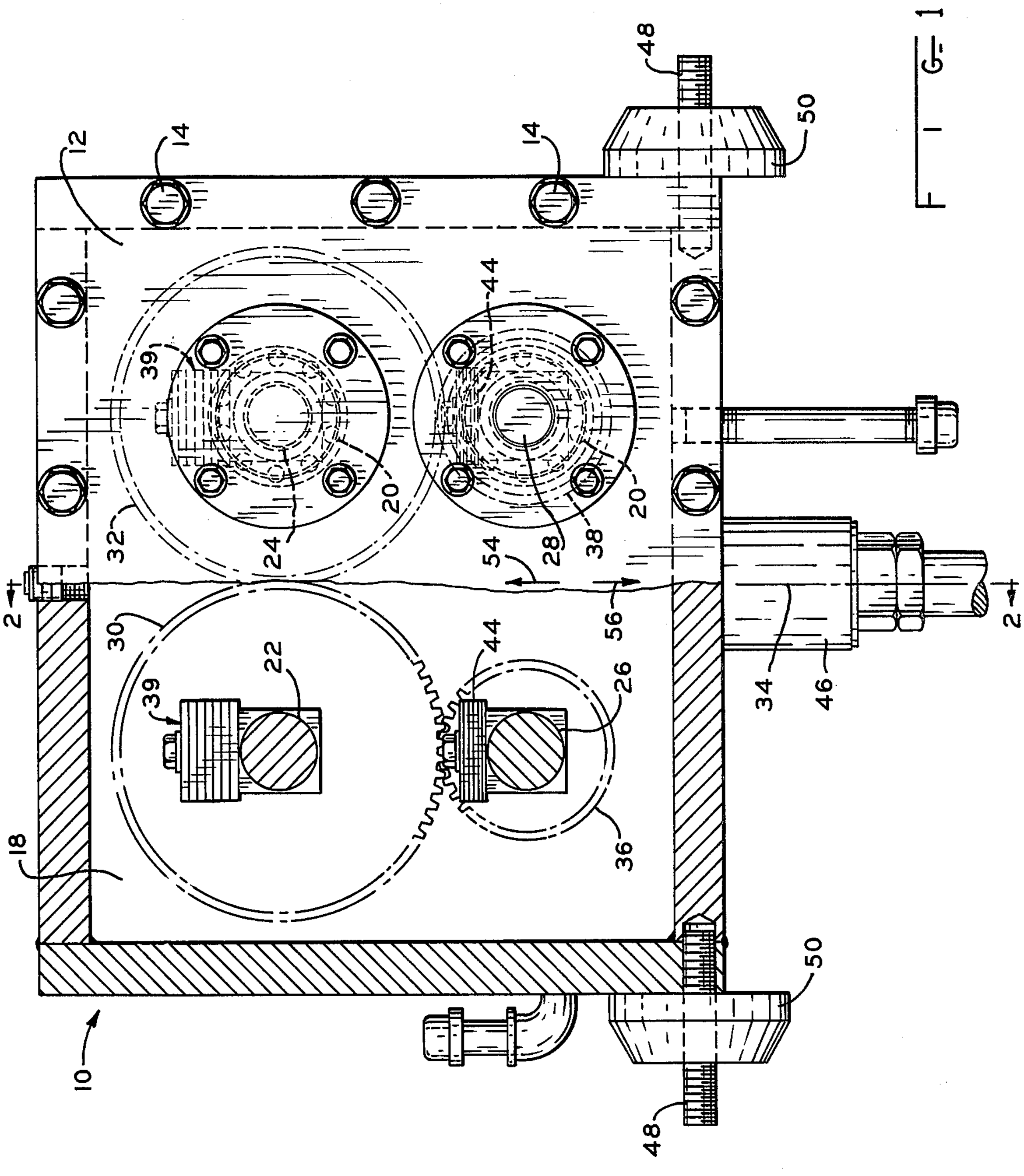
FIG. 1 is a view looking in at the vibrator from one side with the housing partly in section.
Figure 2:
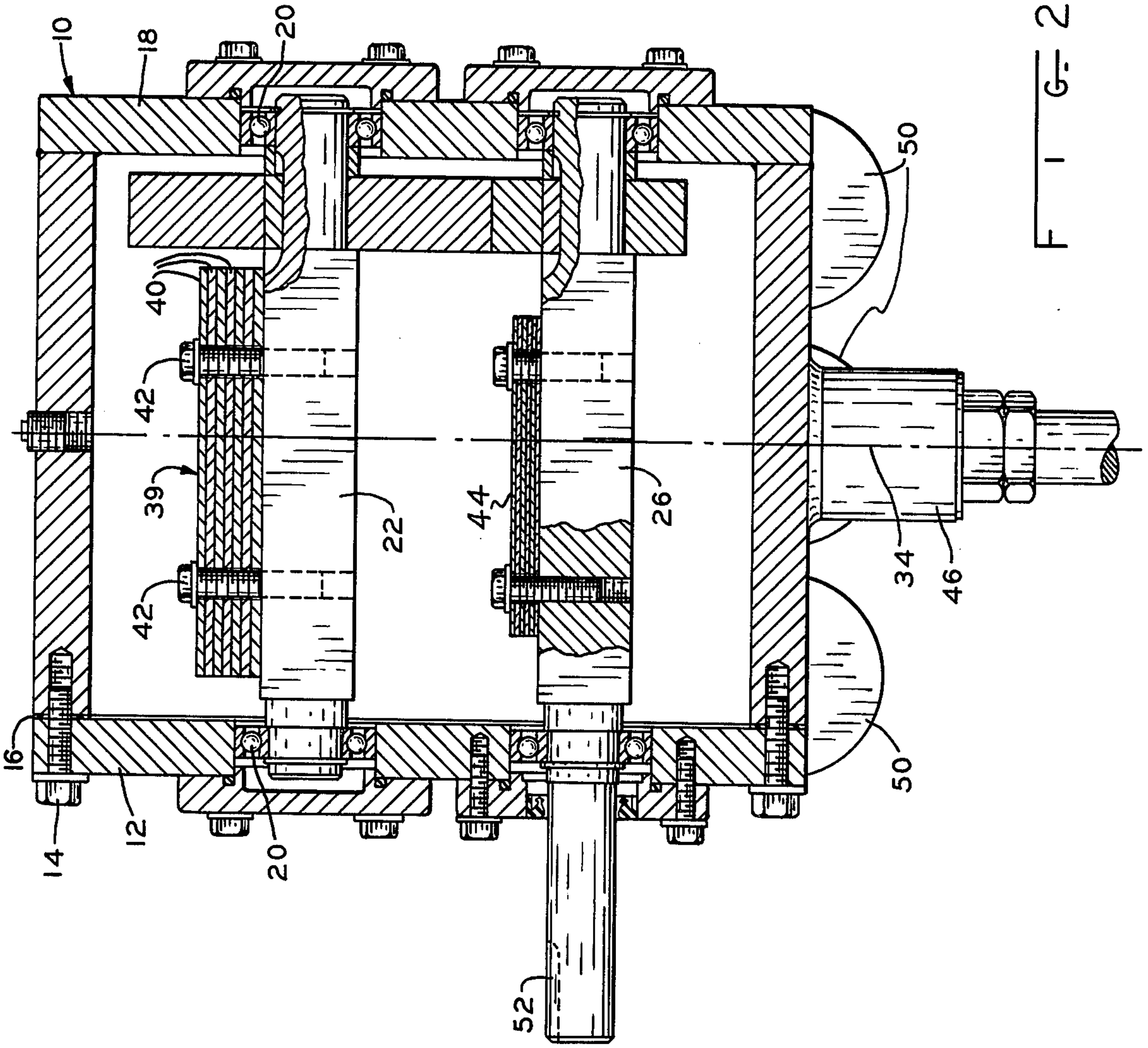
FIG. 2 is a sectional view taken substantially on line 2—2 of FIG. 1.

Referring to the drawings somewhat more in detail, the vibrator according to the present invention is made up of a sealed, rectangular housing 10 which may consist of a plurality of plates welded together to form the housing open on one side closed by a plate 12 secured to the open side by screws 14 and sealed thereto as by a gasket 16.

The opposite wall 18 of the housing and the plate 12 are provided with antifriction bearings 20 which rotatably support a first pair of shafts 22 and 24 and a second pair of shafts 26 and 28, the axes of the shaft pairs defining parallel planes.

The first mentioned shafts 22 and 24 carry respective gears 30 and 32 which are in mesh so that shafts 22 and 24 run at the same speed in opposite directions. These shafts are, likewise, aligned in a plane extending transversely and more particularly normal to a longitudinal axis of the housing indicated by dashed line 34.

Spaced from gears 22 and 24 in a direction parallel to axis 34 are the aforementioned shafts 26 and 28, each of which has thereon a respective gear 36, 38 meshing with a respective one of gears 30, 32. This arrangement provides for shafts 26 and 28 to run at the same speed and in respectively opposite directions but at twice the speed of shafts 22 and 24 to which shafts 26 and 28 are geared.

Each of the aforementioned shafts intermediate the supporting bearings 20 therefor is rectangular in cross section as will best be seen in FIG. 1, and on one side of each of the aforementioned shafts is a stack of plates forming weight elements to provide each shaft with an eccentric weight.

A typical set of the weight elements will be seen attached to each of the shafts in the drawings as, for example, the stack of elements indicated at 39 on shaft 22 which will be seen to comprise a plurality of stacked metal, such as steel, congruent plates 40 with the plates being apertured and clamped to the respective shaft by screws 42. The same construction is followed in respect of each of the shafts for providing weights therefor with the weights pertaining to shafts 26 and 28 having less mass than the weights connected to shafts 22 and 24. For convenience, both of the weights on shafts 22 and 24 are identified generally by reference numeral 39 while those on shafts 26 and 28 are generally identified by reference numeral 44. The two weights 39 on shafts 22 and 24 are preferably substantially identical as are the two weights 44 on shafts 26 and 28.

The stacks 39 and 44 are so arranged on the respective shafts 22, 24, 26, 28 such that for one position of shaft rotation all stacks are in identical rotated positions as shown in the drawings and for a second rotated position the opposed stacks 39 and 44 are in 180° opposition:

for example, in the second position weights 39 and 44 on shafts 22 and 26, respectively, and weights 39 and 44 on shafts 24 and 28, respectively, are rotationally adjacent. Thus, for each predetermined half revolution of shafts 22 and 24 the weights 39 and 44 are rotationally "in phase" and "out of phase", respectively.

The housing 10 is provided with rigid connector element or bar 46 projecting therefrom coaxial with axis 34 and adapted for connection to a screen, shaker plate or separator element of whatever design it is desired to reciprocate.

To inhibit vibration of the housing 10 in any direction other than parallel to axis 34, the housing is provided with laterally extending threaded studs 48 on which a multiplicity, such as six, rubber shock mounts 50 are mounted. These rubber mounts 50 in which the rubber is in shear permit vertical reciprocation parallel to axis 34 as indicated by arrows 54, 56.

The mounts 50 are so sized and are of such design as shown as will permit the desired pattern of reciprocation in the desired direction 34 only. One suitable shock mount is purchased from U.S. Rubber Company and identified as Uniroyal Rubber Mount No. 10Z2-330B. As the drawings show, there are three such mounts 50 equally spaced apart in a straight line on each side of the housing 10 at the bottom side thereof, the mounts 50 on opposite housing sides having the mounting studs 48 in axial alignment, respectively.

One of the shafts, for example, shaft 26, has a drive portion 52 projecting outwardly from the housing and adapted for connection to a drive motor or for receiving a pulley which can be belt driven from a drive motor.

The housing 10 may, of course, contain oil for lubricating the gears and bearings and is, preferably, so disposed in the housing that the rapidly rotating weights agitate the lubricating oil to develop a mist for lubricating the bearings and gears.

In operation, shaft 26 is driven at a suitable speed, and in one rotated position of the shafts, the respective weight elements 39 and 44 will be in rotational registration in a direction parallel to axis 34 and thus impart a maximum resultant force on housing 10 parallel to axis 34 in the direction of the arrow 54 indicated on FIG. 1.

When shafts 22 and 24 have rotated 180°, shafts 26 and 28 will have rotated 360°, so that, at this time, weight elements 44 are in their FIG. 1 position, while weight elements 39 are 180° removed from their FIG. 1 position, and a resultant force is imparted to housing 10 in the direction of arrow 56 on FIG. 1 and which force is smaller than the force developed on the housing in the direction of arrow 54.

The screen or shaker plate or the like connected to the housing 10 by means of bar 46 is, thus, jerked more strongly in direction 54 than in the other direction 56 and, as is well known, this will impart a desired movement to material on or passing over the screen or shaker plate (not shown).

Intermediate the two positions referred to above, the forces imparted to the housing 10 by the rotating weights are cancelled out due to the rotational location and orientation of the weights within the housing, the shock mounts 50 flexing in shear, that is in a direction at right angles to the axes of studs 48, but not in compression, that is in a direction parallel to said axes, whereby vibration of housing 10 is limited essentially to a direction parallel to axes 34.

The reciprocatory excursion of housing 10 may be adjusted by adding or deleting metal plates 40 to alter the weight of the stacks 39 and/or 44, this being accomplished by removing threaded fasteners 42, stacking the number of plates 40 desired on the respective shaft and then replacing fasteners 42 to secure the plates rigidly together. The only limitation as to the number of plates 40 is that stack height be no greater than necessary to provide rotational clearance between adjacent stacks 39 and 44. In a preferred embodiment, the two stacks 39 are adjusted to be of equal size and weight as are the two stacks 44. While the input speed to the shaft 52 may vary, a suitable speed for one working embodiment of this invention is 3600 revolutions per minute with the gear ratios being such as to produce 1800 vibrations per minute.

While there have been described above the principles of this invention in connection with specific apparatus, it is to be clearly understood that this description is made only by way of example and not as a limitation to the scope of the invention.

What is claimed is:

1. A vibrator device, especially for vibrating screen elements, and comprising: a housing, first and second pairs of parallel shafts rotatable in said housing, and means for driving said shafts, the shafts of each pair rotating in opposite directions and the shafts of one pair of rotating at one-half the speed of the other pair, off-center weights detachably mounted on each shaft and so oriented on the respective shafts that rotation of said shafts will exert reciprocating forces on said housing in a direction parallel to a plane normal to a plane including the axes of said first pair of shafts, said weights being radially positioned in rotational alignment such that the rotation thereof define cylinders that are radially juxtaposed, the weights on said first pair of shafts, respectively, being of equal weight and the weights on said second pair of shafts, respectively, being of equal weight.

2. A vibrator device according to claim 1 in which said off-center weights each comprise superposed strips of material extending longitudinally along the respective shaft, and threaded fasteners extending through said strips and threaded into the respective shaft to hold the strips in place on the shaft.

3. A vibrator device according to claim 1 in which each shaft has a longitudinal flat formed thereon, said weights each comprising a stack of strips of material mounted on the flat of the respective shaft, and screws extending through each stack of strips and into the respective shaft to hold the strips in place on the shaft.

4. A vibrator device according to claim 1 in which said housing includes shock-mounting means for inhibiting vibration of said housing in directions at an angle to said parallel direction.

5. A vibrator device according to claim 1 in which the shafts of one of said pairs have meshing first gears connected thereto while the shafts of the other pair have second gears connected thereto and meshing with respective ones of said first gears, said weights being located to one side of said gears.

6. A vibrator device according to claim 1 in which one of the shafts of said other pair extends outwardly from said housing and is adapted for connection to a drive motor.

7. A vibrator device according to claim 1 in which said housing includes means fixed thereto and extending therefrom in said parallel direction for connection to a screen element.

8. A vibrator device according to claim 1 in which the weights connected to the shafts of said one pair are of greater mass than the weights connected to the shafts of said other pair.

9. A vibrator device according to claim 8 in which the shafts of each said pair are disposed in respective first planes perpendicular to said parallel direction while one shaft of each pair is disposed in a respective second plane parallel to said one direction.

10. A vibrator device according to claim 9 in which said shaft-driving means includes gearing drivingly interconnecting said shafts, the weights on said shafts being oriented thereon to produce an additive effect in said one direction in one rotated position of said one pair and a subtractive effect in said one direction in a position of said one pair which is 180° away from said one rotated position.

11. A vibrator device according to claim 10 in which the opposite ends of said shafts are rotatably supported by bearings carried by wall portions of said housing, said gearing including a gear on one end of each shaft, the two gears on one each of said first and second shaft pairs being meshed as are the two gears on the other of said shaft pairs, each said weight including a plurality of congruent elongated metal plates in stacked relation superposed on the respective shaft in parallelism therewith, each stack being secured to the respective shaft by means of threaded fasteners, the stacks on said first pair of shafts being of substantially equal weight as are the stacks on said second pair of shafts, said stacks extending between the respective gears and the other ends of said shafts and further being in rotational alignment.

12. The vibrator device according to claim 11 in which said housing is sealed, said housing having opposite sides parallel to said second plane, and shock mounts carried by said opposite housing sides, said shock mounts being flexible in a direction parallel to said second plane.

13. The device of claim 1 in which each shaft has at least one axially extending flat side, said weights each comprising a stack of superposed elongated congruent flat strips of metal mounted on said flat side to extend axially of the respective shaft, said weights being of radial dimensions that define cylinders of rotation that are radially spaced, threaded fasteners passing through aligned companion apertures in said strips of each stack to secure rigidly said stacks to said shafts, respectively, gears secured to said shafts at one end of said weights, the gears on said first pair of shafts being meshed, the gears on said second pair of shafts being meshed with respective ones of the gears on said first pair of shafts, the radial thickness of the weights on said first pair of shafts being no greater than the radius of the first shaft gears, and the radial thickness of the weights on said second pair of shafts being no greater than the radius of the second shaft gears.

14. The device of claim 13 including shock mounts secured to opposite sides of said housing for supporting said housing from a stationary frame, said shock mounts being of rubber-like material and having a width dimension greater than the thickness thereof, said mounts being abutted against said housing and held thereagainst by means of studs passed through the thickness thereof and threaded into said housing, and the width dimensions of said mounts extending generally parallel to said parallel direction whereby said housing may reciprocate in said parallel direction by reason of said mounts flexing in shear but is held against vibration in a direction parallel to said studs due to the compressive resistance of said mounts.

* * * * *